Figure 1:
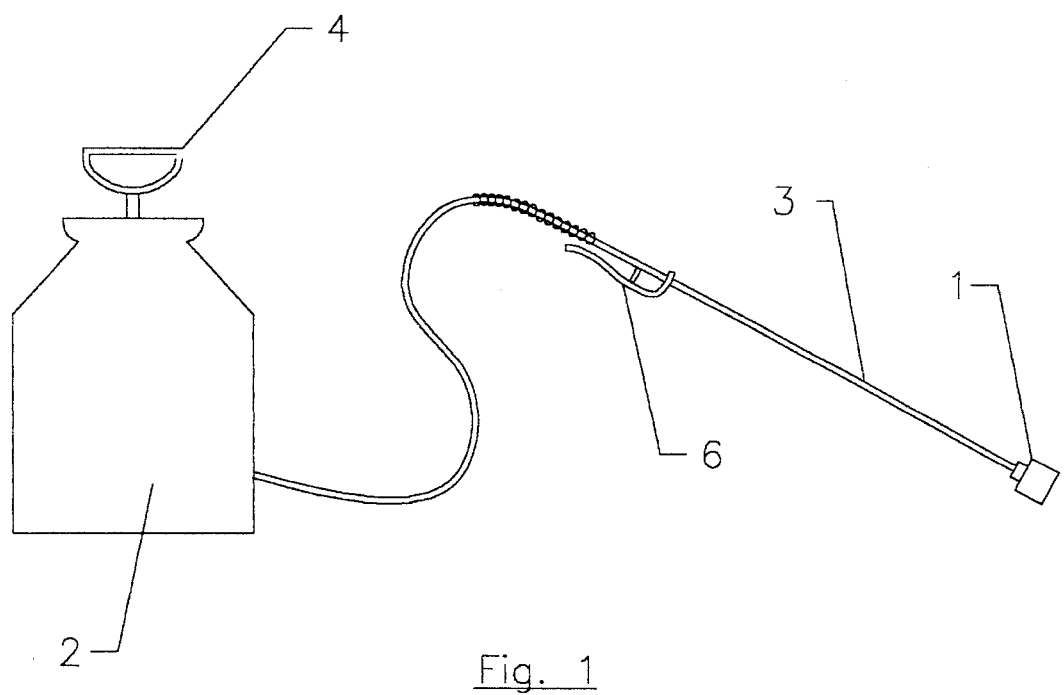
Figure 2:
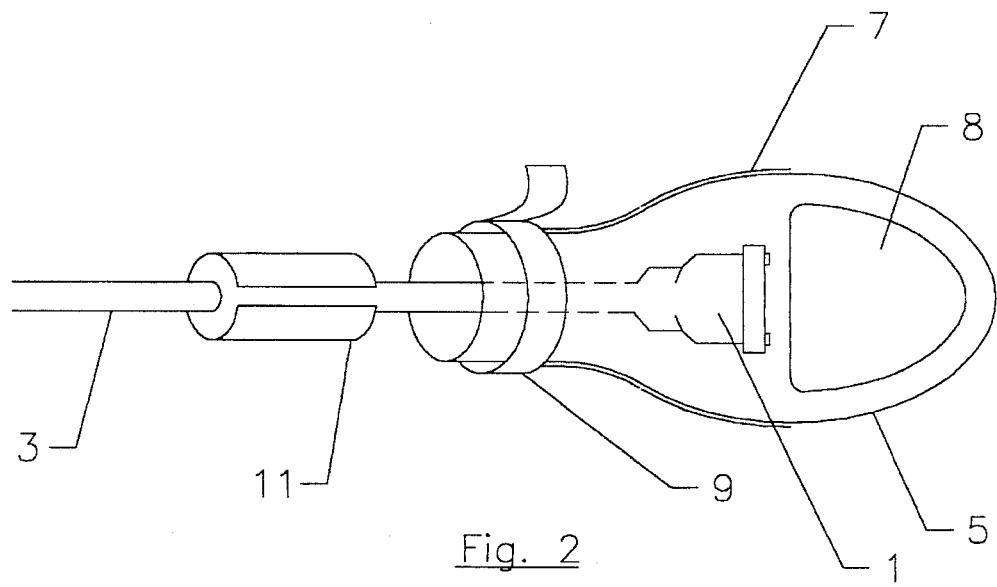
Figure 3:
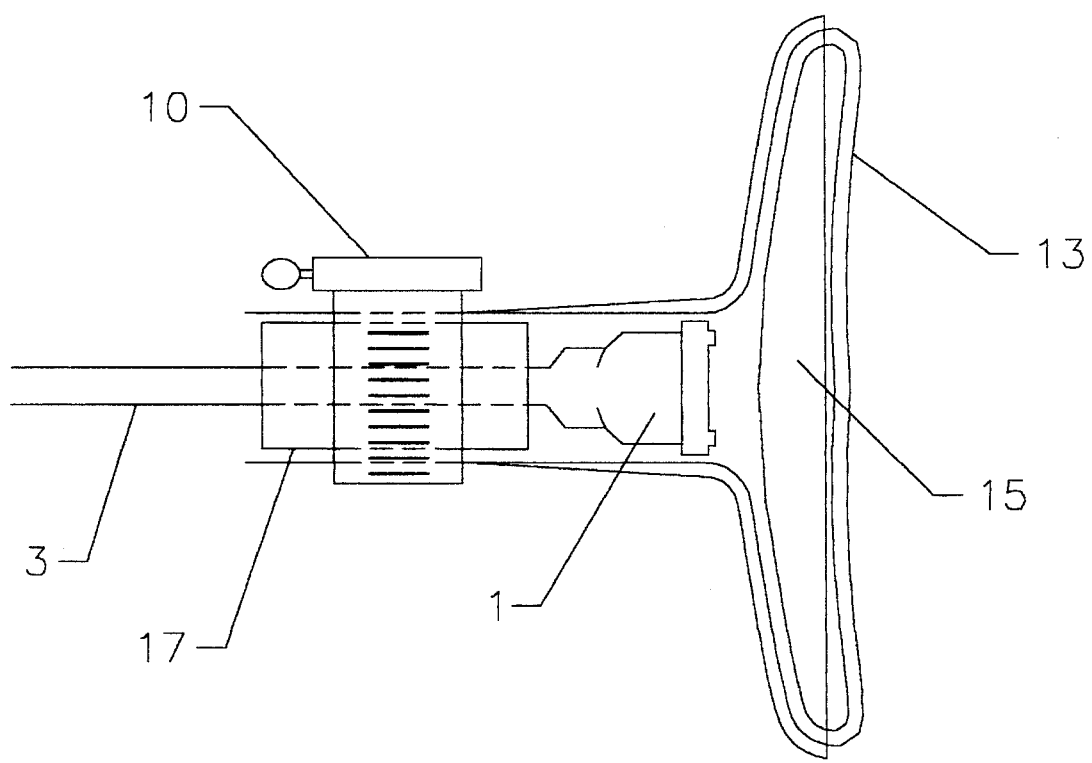
Figure 4:
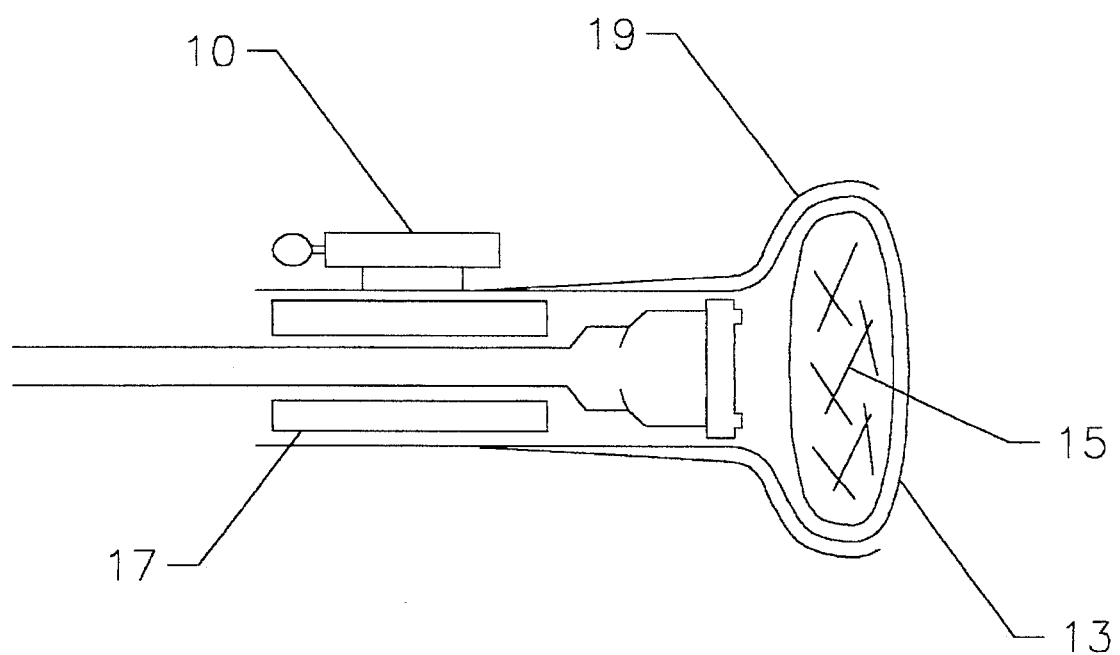

United States Patent

Steglich

[11] Patent Number: 5,544,443
[45] Date of Patent: Aug. 13, 1996

[54] SPRAYER RETROFIT UNIT FOR SPECIFIC AREA HERBICIDE APPLICATION

[76] Inventor: Travis W. Steglich, Rte. 1, Box 118 Indian Creek Rd., Holland, Tex. 76534

[21] Appl. No.: 519,255

[22] Filed: Aug. 25, 1995

[51] Int. Cl.⁶ .................................................. A01C 13/00
[52] U.S. Cl. .................................................. 47/1.5; 401/204
[58] Field of Search .................... 47/1.5; 401/203, 401/204, 205

[56] References Cited

U.S. PATENT DOCUMENTS

| | | | |
|---|---|---|---|
| 2,265,804 | 12/1941 | Deady | 401/203 |
| 2,779,962 | 2/1957 | Cooper | 401/203 |
| 2,940,102 | 6/1960 | Marinus | 401/203 |
| 3,063,084 | 11/1962 | Marinus | 401/203 |
| 4,027,986 | 6/1977 | Patrick | 47/1.5 |
| 4,223,477 | 9/1980 | Abernathy | 47/1.5 |
| 4,383,779 | 5/1983 | Khanzadian et al. | 401/204 |

*Primary Examiner*—Terry Lee Melius
*Assistant Examiner*—Joanne C. Downs
*Attorney, Agent, or Firm*—Joseph F. Long

[57] ABSTRACT

A unit for removably retrofitting a normal air actuated sprayer to be used for wiping an herbicide on a small selected area is disclosed. The unit comprises a porous cloth pouch with an absorbent material such as a piece of a synthetic sponge inside that may be slipped over the spray nozzle and fastened in a water tight manner to the spray pipe. Means to direct drippage or a direct stream of herbicide downward are provided to allow safe use close to and under desirable vegetation.

7 Claims, 3 Drawing Sheets

SPRAYER RETROFIT UNIT FOR SPECIFIC AREA HERBICIDE APPLICATION

BACKGROUND OF THE INVENTION

There are many type applicators currently available for application of herbicides and insecticides. These include power sprayers, hand sprayers and various hand held applicators for wiping on herbicides. Generally the home gardener or homemaker will have a hand powered sprayer for insecticide application. These sprayers generally must be used with great care if used to apply a potent herbicide around or close to trees or desirable shrubs. We find a need to inexpensively and safely eradicate weeds close to trees and which grow through and above low growing shrubs such as creeping junipers. The objective of this invention is to fill the need for a low cost specific area herbicide applicator by using a throw-a-way type retrofit unit to be removably fitted over the spray nozzle on the normal type small pump up sprayer.

The unit comprises a small pouch, lined or loosely filled with an absorber type material such as a synthetic sponge, that will slip over a normal spray nozzle and over a sealing member fitted around the spray pipe below the nozzle to allow fastening the pouch in a water tight manner to the spray pipe. The user may then release the spray solution a small amount at a time until the pouch is saturated or starts to drip. By mixing an herbicide such as RoundUp™ to about twenty times the recommended concentration we found that wiping as little as one drop on a weed or clump of grass is sufficient to eradicate the weed or grass. Of course desired vegetation can just as easily be killed or harmed.

SUMMARY OF THE INVENTION

The invention may be summarized as low cost retrofit units designed to fit over the spray nozzle on a normal type air pressure actuated sprayer commonly used for insecticide or herbicide application in a spray form. The units allow temporary use of the sprayer for concentrated herbicide application by wiping the herbicide on a select area of undesirable vegetation.

In the first embodiment the unit is a teardrop-shaped heavy cloth that may be one to two inches in diameter with a tubular shaped end. The body of the unit may be lined with a layer of absorbent material or may contain a loose fitting segment of synthetic or natural sponge. The tubular shaped end is sized to slide over the usual sized spray nozzle and over a longitudinally split rubber or plastic segment which is placed on the spray pipe below the spray nozzle. With the tubular end slipped over the split segment a flexible compressing type fastening means such as a hose clamp or a strip of Velcro™ may be used to compress the cloth over the split segment to form a water tight seal. With the unit installed a user may saturate the unit to the point of causing a small drip with a concentrated mixture of a herbicide such as Roundup by intermittently briefly opening the sprayer outlet valve. Wiping as little as one or two drops on a weed or clump of grass has been shown to be effective. A second embodiment is essentially the same as the first embodiment but is shaped to allow wiping over a three or four inch wide swath. In both embodiments a shield is used to cover the top portion of the body of the unit to prevent any liquid from being diverted upward thereby allowing use under and very close to desirable vegetation. The plastic shield may be simply a waterproof coating formed in the cloth or may be a reusable removable plastic or metal shield.

BRIEF DESCRIPTION OF DRAWINGS

In FIG. 1 we've shown a normal sprayer of the type suitable for retrofitting to form a wiper type applicator rather than a spray applicator.

In FIG. 2 we've shown a three dimensional view of the first embodiment.

In FIG. 3 we've shown a top view of a second embodiment of the invention.

In FIG. 4 we've shown a side view of the second embodiment.

DETAILED DESCRIPTION OF THE INVENTION

The invention may best be explained from the drawings. There are two embodiments of the invention. The first embodiment is designed for treatment of very small areas such as single weeds in a lawn while the second embodiment is designed for slightly larger areas.

In FIG. 1 we show sprayer body 2 which should be about one gallon in size for ease of handling but larger sprayers could be used. Manual air pump 4 is also used to provide a fill opening for the tank 2. With liquid and air pressure in the tank 2, opening hand valve 6 allows liquid to go through spray pipe 3 and out the spray nozzle 1 in a spray pattern. When fitted with a retrofit unit as shown in FIGS. 2 and 3 the valve 6 may snapped open and shut to soak the retrofit unit without causing an exit stream. We've shown the first embodiment of the retrofit unit in FIG. 2. The body of the unit or soaker head is a tear drop shaped heavy porous cloth 5 with a tubular end opening large enough to slide over the spray nozzle 1. The compressible sealing segment 11 may be a longitudinally split portion of a rubber hose or may be a reasonably soft plastic such as a polyethylene polymer. Alternatively the sealing segment may be a segment of rubber hose sipped over spray pipe 3 after temporarily removing the spray nozzle 1. The sealing segment could be left in place without interfering with normal use of the sprayer. With the sealing segment 11 pushed under the tubular end of the body 5 a Velcro™ strap 9 acting as a compressing fastener may be used to form a water tight connection of body 5 to the spray pipe 3. In this embodiment a water impervious coating 7 formed in the cloth prevents an upward spray if valve 6 is inadvertently opened too much. We have shown a sponge segment 8 sized and located to catch and hold liquid to allow a wiping type application. In FIG. 3 we've shown a top view of a second embodiment of the invention. This embodiment is quite similar to the first embodiment but is shaped to cover a wider area. Many other shapes would be within the purview of the invention. In this embodiment the soaker head comprising cloth body 13 has a long narrow shape and is held in loosely in this shape by a segment of an absorbent material such as an artificial sponge. A reusable plastic or metal shield 19 prevents a liquid spray upwards with too much opening of hand valve 6, FIG. 1. Sealing segment 17 fits closely around pipe 3 and is not split as in the first embodiment and is installed by slipping over pipe 3 after temporarily removing spray head 1. Reusable hose clamp 10 is used to compress the cloth over sealing segment 17 to hold the unit attached in a water tight manner to pipe 3. In Fig. 4 we've shown a side cut-a-way side view of the second embodiment with all the elements as previously discussed. The shape is intended to minimize the volume of liquid necessary to saturate the unit to the drip point for use. Since a concentrated herbicide is used minimum volume to reduce waste is both economically and environmentally desirable.

What is claimed is:

1. A disposable retrofit wiper type applicator unit for a sprayer comprising:
   a) a soaker head means fastenable over a spray nozzle on said sprayer, said soaker head means comprising:
      1) a pear shaped porous fabric pouch with an inlet opening on a smaller end that is large enough to slipover said spray nozzle,
      2) a water impervious elongated compressible sealing means and a flexible compressing fastener means, said elongated compressible sealing means fitting over a spray nozzle pipe attached to said spray nozzle and being sized to slide into said inlet opening of said pouch; said compressing fastener means being sized to allow manually sliding over said inlet opening of said pouch after said elongated compressible means is fitted into said pouch and with said compressing fastener means being manually activatable to fasten said pouch in a water tight manner to said spray nozzle pipe; and
      3) a water absorbent material shaped to loosely fill an interior of said pouch.

2. A disposable retrofit wiper type applicator unit for a sprayer as in claim 1 wherein said compressible sealing means is a segment of rubber tubing split longitudinally.

3. A disposable retrofit wiper type applicator unit for a sprayer as in claim 1 wherein said flexible compressing fastener means is a hose clamp.

4. A disposable retrofit wiper type applicator unit for a sprayer comprising:
   a) a soaker head means fastenable over a spray nozzle on said sprayer, said soaker head means comprising:
      1) a porous fabric pouch means with an inlet opening on a smaller end that is large enough to slip over said spray nozzle and with a larger end a minimum of two inches wide,
      2) a water impervious means covering a top portion of said porous fabric pouch means to prevent liquid from a top portion of said pouch means from contacting vegetation;
      3) a water impervious elongated compressible sealing means and a flexible compressing fastener means, said elongated compressible sealing means fitting over a spray nozzle pipe attached to said spray nozzle and being sized to slide into said inlet opening of said pouch means; said flexible compressing fastener means being sized to allow manually sliding over said inlet opening of said pouch means after said compressible sealing means is fitted into said pouch means and being manually activatable to fasten said pouch means in a water tight manner to said spray nozzle pipe;
      4) a water absorbent material shaped to loosely fill an interior of said pouch means.

5. A disposable retrofit wiper type applicator unit for a sprayer as in claim 4 wherein said elongated compressible sealing means is a segment of rubber tubing.

6. A disposable retrofit wiper type applicator unit for a sprayer as in claim 4 wherein said flexible compressing fastener means is a hook and loop fastener.

7. A disposable retrofit wiper type applicator unit for a sprayer as in claim 4 wherein said water impervious covering means is a reusable plastic shield.

* * * * *